L. L. WERNER.
ADJUSTABLE CASTER.
APPLICATION FILED APR. 15, 1920.
1,367,761.
Patented Feb. 8, 1921.
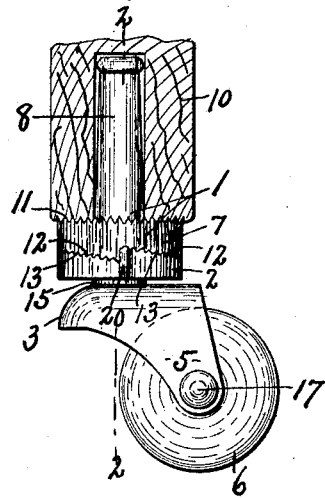
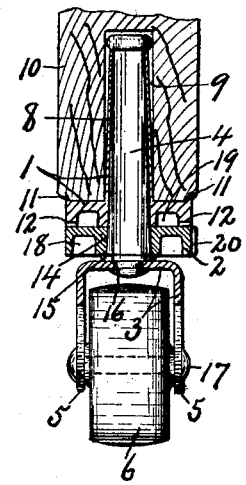
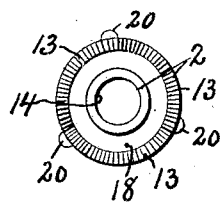
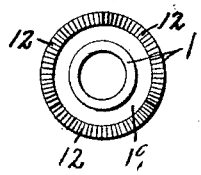
INVENTOR
L. L. Werner
BY
Howard P. Denison
ATTORNEY.

UNITED STATES PATENT OFFICE.

LIONEL L. WERNER, OF SYRACUSE, NEW YORK.

ADJUSTABLE CASTER.

1,367,761. Specification of Letters Patent. Patented Feb. 8, 1921.

Application filed April 15, 1920. Serial No. 374,083.

*To all whom it may concern:*

Be it known that I, LIONEL L. WERNER, of Syracuse, in the county of Onondaga, in the State of New York, have invented new and useful Improvements in Adjustable Casters, of which the following, taken in connection with the accompanying drawings, is a full, clear, and exact description.

This invention relates to certain improvements in casters for phonograph, music and analogous cabinets adapted to be supported upon a floor which in many instances is more or less uneven and enables the cabinet to tilt or rock laterally by reason of the fact that all of the casters do not engage the floor at the same time.

The main object of my invention is to provide the caster with means whereby it may be easily and quickly adjusted to compensate for any slight irregularity in the level of the floor surface.

Other objects and uses will be brought out in the following description:

In the drawings:

Figure —1— is a side elevation of my improved caster and adjacent portion of the leg of a cabinet in which it is mounted, the leg portion being shown in section.

Fig. —2— is a sectional view taken on line 2—2, Fig. —1—.

Figs. —3— and —4— are, respectively, an inverted plan of the cam sleeve and a top plan of the cam nut for effecting the adjustment of the caster.

As illustrated, this caster comprises a sleeve section —1—, a nut section —2—, and a roller supporting frame —3—, which is swiveled to a suitable spindle —4— and is provided with opposite arms —5— carrying a suitable roller —6—.

The sleeve section —1— is provided with an enlarged head —7— and an upwardly tapered tubular shank —8—, the latter being inserted in an opening —9— in the lower end of a cabinet leg, as —10—.

The head —7— rests against the lower end face of the leg —10— and is provided with a marginal series of upwardly projecting spurs or teeth —11— adapted to enter the adjacent end of the leg —10— to hold the sleeve against turning, the lower end of said head being provided with opposite circumferentially extending cam faces —12—, which are serrated circumferentially to coöperate with similarly serrated cam faces —13— on the adjacent face of the nut section —2— for holding said nut section in its adjusted position.

This nut section —2— is provided with a central aperture —14— for receiving the spindle —4—, the lower end of the nut section normally resting upon a flange —15— on the lower end of said spindle to allow the nut to be adjusted rotarily with the minimum amount of friction with the spindle.

The portion of the spindle immediately below the annular shoulder or flange —15— is passed through an aperture —16— in the upper horizontal wall of the U-shaped frame —3— and is upset against the inner face of said frame to form a swivel connection between said spindle and frame, and to allow the latter with the roller —6— thereon to turn freely about the axis of the spindle independently thereof. Although the spindle is free to turn in the sleeve if desired, the roller —6— is journaled upon the transverse spindle —17— having its ends secured in the opposite arms —5— of the frame —3—, the axis of the roller being off-set some distance to one side of the vertical axis of the spindle —6— to allow the roller to trail in the direction of movement of the cabinet when the latter is shifted at different angles along the floor.

The serrated cam faces —13— on the upper end of the nut correspond to those on the adjacent lower end of the head —7— of the sleeve —8— so that by turning the nut to the right, Figs. —1— and —2—, the higher points of the cams —13— will be caused to ride along and toward the lower points of the cams —12— for adjusting the roller downwardly or leg upwardly, the reverse movement of the nut producing a corresponding raising of the roller or lowering of the leg.

The spurs —11— preferably project above the upper surface of the main body of the head —7— to enable them to be more easily and conveniently milled, and for a similar reason the serrations on the cam faces —13— are raised above the upper surface of the main body of the nut and are spaced some distance apart from the opening —14—.

The lower sides of both the head —7— and nut —2— are provided with annular recesses —18— and —19— for reducing the weight of those parts, although the recess —19— in the lower side of the head —7— serves also to facilitate the milling of the serrations on the lower face of said head, the serrated cam faces being concentric with the axis of the spindle and spaced radially some distance therefrom to form relatively light points of contact but sufficient to hold the nut in its adjusted position. The nut —2— is provided with peripheral projections —20— adapted to be engaged by a spanner ring, or equivalent to, for rotating the nut relatively to the head to effect the desired adjustment of the roller of the caster.

What I claim is:

A caster comprising a sleeve, having its lower end provided with an enlarged, cylindrical head, said head having its upper end provided with a marginal series of upwardly projecting spurs for engaging the article to be supported and its lower end provided with a plurality of similar serrated cam faces concentric with the axis of the sleeve and each inclined from end to end at the same angle relatively to said axis, a spindle journaled in the sleeve and extending some distance below said cam faces and having its lower end provided with an annular flange, a roller-supporting frame mounted on the lower end of the spindle below said flange, a roller mounted in the frame, and a nut section journaled on the spindle between the head of the sleeve and flange of the spindle and having its upper end face provided with a plurality of similar serrated cam faces of substantially the same circumferential length, as those on the head of the sleeve and engaged therewith, said nut being provided with peripheral projections for engagement by a suitable tool by which it may be turned relatively to the sleeve and spindle.

In witness whereof I have hereunto set my hand this 27th day of March, 1920.

LIONEL L. WERNER.

Witnesses:
 H. E. CHASE,
 R. G. CARROLL.